(12) United States Patent
Van Meirhaeghe et al.

(10) Patent No.: US 12,338,393 B2
(45) Date of Patent: Jun. 24, 2025

(54) METHOD FOR PYROLYSIS OF WASTE MATERIAL IN AN INDUSTRIAL PROCESS

(71) Applicant: CCT INTERNATIONAL, Antwerp-Berchem (BE)

(72) Inventors: Rik Van Meirhaeghe, Gavere (BE); Johannes Dingenis Van Der Endt, Antwerp (BE); Dries Parmentier, Outrijve (BE)

(73) Assignee: CCT INTERNATIONAL, Antwerpen-Berchem (BE)

( * ) Notice: Subject to any disclaimer, the term of this patent is extended or adjusted under 35 U.S.C. 154(b) by 185 days.

(21) Appl. No.: 18/016,296

(22) PCT Filed: Jul. 12, 2021

(86) PCT No.: PCT/IB2021/056251
§ 371 (c)(1),
(2) Date: Jan. 13, 2023

(87) PCT Pub. No.: WO2022/013712
PCT Pub. Date: Jan. 20, 2022

(65) Prior Publication Data
US 2023/0265348 A1    Aug. 24, 2023

(30) Foreign Application Priority Data

Jul. 17, 2020    (BE) .................................. 2020/5538

(51) Int. Cl.
*C10B 47/44*    (2006.01)
*B29C 48/14*    (2019.01)
(Continued)

(52) U.S. Cl.
CPC .......... *C10B 47/44* (2013.01); *B29C 48/1472* (2019.02); *C10B 53/07* (2013.01); *C10B 57/10* (2013.01); *C10B 47/34* (2013.01)

(58) Field of Classification Search
CPC ............................ C10B 53/07; B29C 48/1472
See application file for complete search history.

(56) References Cited

U.S. PATENT DOCUMENTS 3,947,256 A * 3/1976 Tsukagoshi ............... C10B 7/10
208/15
5,608,136 A * 3/1997 Maezawa ................. C10G 1/10
588/317
(Continued)

FOREIGN PATENT DOCUMENTS

WO    2020070343 A1    4/2020
WO    2022013712 A1    1/2022

OTHER PUBLICATIONS

Search Report from Belgian Application No. 202005538, Mar. 17, 2021.
(Continued)

*Primary Examiner* — Jonathan Luke Pilcher
(74) *Attorney, Agent, or Firm* — Workman Nydegger

(57) ABSTRACT

A method for pyrolysis of a mass of waste material, includes: providing a screw arrangement adapted to supply heat to the mass by mechanical shear; providing a reactor after the screw arrangement, adapted to supply heat to the mass in the absence of oxygen by heating the reactor wall; heating the mass to an exit temperature and increasing the pressure to an exit pressure in the screw arrangement; thermally degrading the mass in the reactor. The mass is brought into an extreme condition at the exit temperature and exit pressure by the screw arrangement, such that during the pressure drop pyrolysis occurs, thereby forming gaseous hydrocarbons within the connecting element.

15 Claims, 6 Drawing Sheets

(51) Int. Cl.
*C10B 47/34* (2006.01)
*C10B 53/07* (2006.01)
*C10B 57/10* (2006.01)

(56) References Cited

U.S. PATENT DOCUMENTS

| | | | | |
|---|---|---|---|---|
| 5,686,055 | A * | 11/1997 | Takahashi | C07C 63/16 549/250 |
| 5,895,827 | A * | 4/1999 | Takahashi | C07C 51/56 201/2.5 |
| 6,048,380 | A * | 4/2000 | Asanuma | C10L 9/08 75/414 |
| 6,193,780 | B1 * | 2/2001 | Cases Rocati | F23G 5/0273 29/17.2 |
| 7,144,558 | B2 * | 12/2006 | Smith | C10B 7/10 202/226 |
| 7,691,344 | B2 * | 4/2010 | Yoshimura | F23G 7/12 422/198 |
| 7,893,307 | B2 * | 2/2011 | Smith | C10B 47/44 366/85 |
| 8,187,428 | B2 * | 5/2012 | Shimo | C10B 53/07 422/184.1 |
| 8,864,946 | B2 * | 10/2014 | Scheirs | C22B 7/001 201/19 |
| 10,421,911 | B2 * | 9/2019 | Ullom | C10B 47/30 |
| 2003/0047437 | A1 | 3/2003 | Stankevitch | |
| 2008/0202983 | A1 | 8/2008 | Smith | |
| 2011/0011721 | A1 * | 1/2011 | Champagne | C10L 1/023 202/83 |
| 2011/0233818 | A1 | 9/2011 | Koenig et al. | |
| 2012/0266529 | A1 * | 10/2012 | Scahill | C10C 5/00 202/84 |
| 2016/0024390 | A1 | 1/2016 | Ullom | |
| 2017/0362511 | A1 | 12/2017 | Tenore et al. | |
| 2018/0010049 | A1 | 1/2018 | Tenore et al. | |
| 2022/0363994 | A1 * | 11/2022 | Besong | C10K 1/024 |

OTHER PUBLICATIONS

Search Report from Belgian Application No. 202105543, May 9, 2022.
International Search Report from PCT Application No. PCT/IB2021/056251, Oct. 8, 2021.
Search Report from Netherlands Application No. 2028704, Apr. 6, 2022.

* cited by examiner

METHOD FOR PYROLYSIS OF WASTE MATERIAL IN AN INDUSTRIAL PROCESS

TECHNICAL AREA

The present invention generally relates to the pyrolysis of waste material, for example plastic waste. In particular, the invention provides a solution for an industrial process allowing to produce high-quality pyrolysis products in a time and energy efficient manner.

BACKGROUND OF THE INVENTION

The use of plastic is ubiquitous at present, resulting in huge amounts of plastic waste. The fact that plastic is not bio-degradable necessitates the search for solutions with which plastic waste can be recycled to re-usable products. Pyrolysis or thermal cracking of plastic waste material is an attractive solution here. Pyrolysis involves heating the waste material to a high temperature, in the absence of oxygen, to avoid oxidation or ignition of the material. Hereby a thermal degradation takes place, wherein bonds present in the plastic polymers are broken, resulting in hydrocarbons with a smaller molecular weight than the original polymers. During pyrolysis, on the one hand, a volatile fraction and on the other hand, a fraction of carbonized products is being created. The volatile fraction comprises hydrocarbon chains of various lengths, which, at the high pyrolysis temperature, are all in gaseous form. The carbonized fraction comprises char, which remains, for example, as ashes. A part of the volatile fraction, that is, the long-chain hydrocarbons, may be condensed by cooling into liquid oils, which can be used as liquid fuel, for example in engines. Long chains are typically chains of at least five or six carbon atoms (C5-C6). The remaining hydrocarbons present in the pyrolysis products, that is, those with shorter chains, form a non-condensable gas, which entails that they remain gaseous upon cooling to a normal temperature and under conventional process conditions. Except for plastic, pyrolysis can be carried out in an analogous way for recycling other types of waste material, for example, organic waste, rubber, etc.

Typically, pyrolysis takes place in a reactor. The simplest type of reactor is a batch reactor, namely a sealed reservoir or container in which waste material is heated in the absence of oxygen, by heating the wall of the reservoir. The reservoir can be installed vertically or horizontally. Often an arrangement is present in the reservoir to mix the mass present. In a vertically arranged reservoir, this is typically a central stirring rod, in case of a horizontally arranged reservoir, a mixer with blades. Such type of reactor can be used in batch, where a new charge is added to the reactor only after termination of pyrolysis of the previous charge, or in continuous operation, where new material to be pyrolyzed is continuously added into the reactor during pyrolysis. Furthermore, reactor types are also known in which the mass to be pyrolyzed is moved through the reactor in a continuous process. For example, in a rotary kiln reactor, use is made of a rotating cylinder in which the mass is advanced, or of a screw which moves the mass within a cylinder. The heating of the cylinder wall, typically in successive zones, causes a gradual degradation of the material during its movement through the reactor.

Despite the fact that pyrolysis is known as a technique, in practice there are challenges to apply pyrolysis in an economically feasible industrial process. In the first place, a sufficiently high processing capacity must be realized in such a process, so that sufficient products can be produced in an acceptable time frame. This is not obvious. Indeed, heat has to be transferred to the material to be pyrolyzed, which is a slow process, given the low thermal conductivity of plastic material and the presence of air between the fragments of plastic waste. For example, in a container with material to be pyrolyzed, heat that is applied via the container wall must reach central zones, which takes time. The reactor thus forms a bottleneck in the process. In addition to this time efficiency, the energetic efficiency is also a challenge for achieving an economically profitable process. Indeed, when heat is transferred in an inefficient way, a lot of heat input is required to achieve the desired degradation, so costs for this will be high.

In addition to the challenges in terms of efficiency, the quality of the obtained pyrolysis products is also a challenge. This quality refers to several aspects. On the one hand, it refers to the distribution of hydrocarbons present within the volatile fraction: preferably the distribution is such that a peak occurs in those chains that are most desired as a final product, for example a large presence of chains that may be condensed and can be used as fuel in engines (for example C5-C10). Given the heterogeneous composition of the waste material, this is not obvious. On the other hand, a high quality of pyrolysis products refers to the purest possible volatile fraction, that is, the lowest possible presence of pollutants in the pyrolysis products. For example, Chlorines (Cl) present in PVC or bleached paper give rise to Chlorides in the pyrolysis products, or Bromines (Br) present in flame retardants give rise to Bromides in the pyrolysis products. The presence of such pollutants is detrimental to the quality of the resulting final product. For example, the corrosivity of Chlorides is problematic in further processing the oil or when using it in an engine.

There is thus a general need for pyrolysis solutions which result in a high quality of formed pyrolysis products, and which allow for a time and energy efficient process.

With regard to the improvement of the time and energy efficiency, solutions are known in which the design of the reactor is optimized. For example, in U.S. Pat. No. 7,893, 307 a 'ribbon channel reactor' is proposed, in which the mass to be pyrolyzed is advanced in a ribbon-shaped channel between two heated concentric cylinders. In this way a high ratio of heated surface to the amount of mass to be heated is achieved, and the heat reaches the full thickness of the relatively thin ribbon of material to be pyrolyzed. However, this requires the purchase of a very specific type of reactor, which is a lot more complex and probably more expensive than, for example, a simple reservoir or container. Controlling the temperature evolution to achieve complete degradation and realizing desired chain lengths is also difficult to control in a moving bed reactor. Apart from that, for the more traditional types of reactors with moving bed, such as a rotary kiln or screw reactor, also holds that such control is more difficult than in the case of a type of reservoir or container which does not require working with different temperature zones along the reactor.

Additionally, In U.S. Pat. No. 7,893,307 an extruder is being used, prior to the reactor. In an extruder, the mass is advanced within a cylinder by means of a single or twin screw, whereby heat is transferred to the mass through friction and mechanical shear. In this way the waste material is brought into a 'semi-solid' state before being fed into the reactor. Also, in US2016/0024390 an extruder is being used, prior to a thermal kiln reactor, in a continuous process with defined temperature zones. In the extruder, the material is melted and the release of heteroatoms, for example halogens, from the waste material begins, which are removed through an outlet port on the extruder. Such dehalogenation continues in the first half of the pyrolysis reactor, and efficient cracking, with breaking of carbon-carbon bonds, taking place in the second half of the reactor. Even though the material to be pyrolyzed is already partly heated in such an extruder, much heat still must be supplied in the pyrolysis reactor afterwards in order to achieve actual degradation, with formation of volatile hydrocarbons. As a result, achieving the above-mentioned energy and time efficiency remains a challenge.

It is an object of the present invention to describe a method which overcomes one or more of the above-described disadvantages of the prior art. More specifically, it is an object of the present invention to describe a method for pyrolysis of a waste material that makes it possible to produce high-quality final products in a time and energy efficient way.

SUMMARY OF THE INVENTION

According to the present invention, the above-identified objectives are achieved by a method for pyrolysis of a mass of waste material comprising:
  providing a screw arrangement adapted to supply heat to the mass by mechanical shear;
  providing a connecting element, connected to the exit of the screw arrangement;
  providing a reactor after the connecting element, adapted to supply heat to the mass in the absence of oxygen by heating the reactor wall with an external heat source;
  heating the mass in the screw arrangement to an exit temperature, wherein the mass is at least partially melted;
  transporting the mass through the connecting element;
  thermally degrading the mass in the reactor wherein carbon-carbon bonds in the mass are broken by pyrolysis and volatile hydrocarbons are formed,
  wherein the method further comprises:
  increasing the pressure of the mass through the screw arrangement, to an exit pressure;
  expanding the mass in the connecting element, with a pressure drop from the exit pressure to a lower pressure;
  wherein the mass is brought into an extreme condition at the exit temperature and exit pressure by the screw arrangement, such that during the pressure drop pyrolysis occurs, thereby forming gaseous hydrocarbons within the connecting element.

In other words, the invention relates to a method for pyrolysis of a waste material. A waste material refers to a carbonaceous waste material. For example, it is a mixture of plastic waste, in which various types of plastic may be present, for example PE (Polyethylene), PP (Polypropylene), PVC (Polyvinyl chloride), PET (Polyethylene terephthalate), PS (Polystyrene), etc. Other examples are organic waste, food waste, animal feed, rubber, wood, textiles, etc. Pyrolysis of the waste material refers to the formation of hydrocarbons with a smaller molecular weight than the original polymers, by thermal degradation.

The method involves providing a screw arrangement adapted to supply heat to the mass by mechanical shear. A screw arrangement is a unit comprising one or more screws, typically located within a barrel. For example, it is a single screw extruder, or a twin-screw extruder with two screws. The mass is fed into the entrance of the screw arrangement so that it is located between the screw or screws and the wall of the barrel, thereby being moved towards the exit of the screw arrangement. By rotating the screw or screws, shear or friction is created in the mass, so that a heating of the mass occurs through viscous dissipation. In a possible embodiment, the drive of the screw or screws supplies all the energy for heating the mass. In another embodiment there are also heating elements adapted to heat the wall of the barrel via an external heat source. The heating of the mass then takes place partly by mechanical shear and partly by heat transfer due to the heated wall. In an embodiment it is also possible for the screw or screws to be heated.

The method involves heating of the mass in the screw arrangement, up to an exit temperature, thereby at least partially melting the mass. The waste material is fed into the screw arrangement in solid state. Typically, a pre-processing has occurred, wherein, for example, plastic waste was processed into smaller pieces of plastic in the solid state, before feeding into the screw arrangement. As a result of the heating in the screw arrangement, by mechanical shear, possibly supplemented by a heated barrel, the waste material within the screw arrangement begins to melt. Melting refers to the transition from a solid to a liquid state. Often, this is not a sharply defined transition, but the mass is going first from a solid form to a semi-solid, viscous paste. Due to heterogeneity in the composition of the waste material, for example a mixture of various plastic types, it is possible that certain components in the mass already melt, while other components are still solid. The occurrence of melting in the screw arrangement means that there are certainly components present that have already melted at the exit of the screw arrangement. Typically, much or all of the mass is melted at the exit of the screw arrangement.

The method involves providing a reactor after the screw arrangement, adapted to supply heat to the mass in the absence of oxygen by heating the reactor wall with an external heat source. The reactor is located after the screw arrangement, which entails that the mass after its stay in the screw arrangement is transported to the reactor, via a connection between the screw arrangement and the reactor. Given the liquid state, there is typically a flow transport through one or more tubes between the screw arrangement and the reactor. Within the reactor, a further heating of the mass takes place. The heat supply comes from a heated reactor wall. The reactor wall is heated by means of an external heat source, for example an electrical heating or heat from combustion of a fuel. Various types of reactors are possible in different embodiments. In one embodiment, the reactor comprises a reservoir or container, into which a mass can be fed to a certain filling level, but wherein the mass is not transported through the reactor. Such type of reactor may also be referred to as a batch reactor. However, a movement of the mass is possible as a result of mixing, for example by means of a stirring rod or mixer arranged within the reservoir. In another embodiment, use is made of a reactor type in which the mass is transported through the reactor. For example, in a rotary kiln reactor, use is made of a rotating cylinder in which the mass is advanced, or of a screw which moves the mass within a cylinder.

The method involves thermal degradation of the mass in the reactor whereby carbon-carbon bonds in the mass are broken by pyrolysis and volatile hydrocarbons are formed. The reactor is heated in such a way that a pyrolysis temperature prevails inside the reactor. Thermal degradation takes place by heating the mass within the reactor to the pyrolysis temperature in the absence of oxygen. In this process, carbon-carbon bonds are broken, so that hydrocarbons are formed with a lower molecular weight than the original polymers. During the pyrolysis, a volatile fraction is formed on the one hand and a fraction of carbonized products on the other. The volatile fraction comprises hydrocarbon chains of various lengths, which are all gaseous at the high pyrolysis temperature. A part of the volatile fraction can be condensed into liquid oils by cooling in a further process step.

In various embodiments, different modes of operation are possible. In one embodiment, use is made of a reservoir or container, which is used in batch. This means that a new batch of mass is only fed into the reservoir after pyrolysis of the previous batch has ended. In another embodiment, use is made of a reservoir or container, which is operated in a continuous mode. This means that while pyrolysis is in progress in the reservoir, new material is continuously fed into the reservoir. The rate of feeding must then be matched to the rate at which mass disappears from the reactor in the form of volatile hydrocarbons. An alternation between batch mode and continuous mode is also possible when using a reservoir or container as a reactor. In yet another embodiment, a reactor type is used in which the mass is advanced through the reactor. Each time, new mass is supplied to one end of the reactor, and degradation takes place during transport through the reactor towards the other end.

After the screw arrangement, a connecting element is provided, typically one or more pipes or tubes connected to the exit of the screw arrangement, in which the mass arrives after leaving said exit. In an embodiment, the connecting element provides for a direct connection between the exit of the screw arrangement and the reactor. In another embodiment, a buffer tank may be present between the screw arrangement and the reactor, wherein the connecting element connects the screw arrangement to the buffer tank. The buffer tank then serves as a temporary storage, from which mass can be pumped to the reactor through a second connection.

Throughout the screw arrangement, apart from a temperature increase to an exit temperature, also a pressure increase takes place: as the mass is advanced towards the exit, a pressure build-up takes place in the mass. In this way, the mass is brought into an extreme condition at the exit of the screw arrangement, at the prevailing exit temperature and exit pressure. This extreme condition is such that on the one hand the mass is maximally heated, thereby being brought very close to degradation. On the other hand, the increased pressure prevents substantial pyrolysis to occur during the stay of the mass in the screw arrangement.

Indeed, on the one hand, the mass is heated to the highest possible temperature when leaving the screw arrangement. The highest possible temperature here refers to reaching a temperature level that is close to a threshold value, or even slightly exceeds that threshold value. This threshold value is the temperature level at which the breaking of carbon-carbon bonds starts, so the temperature level at which the easiest to be cracked components present in the mass start to degrade, and hydrocarbon vapors are released. In a heterogeneous composition, for example when different types of plastic are mixed together, some components will be very close to degradation at the threshold value specified, while other components will only begin to degrade at a higher temperature level than this threshold value. It is also possible that in the screw arrangement already a limited amount of gaseous hydrocarbons is being formed. In other words, in that case the threshold value has just been exceeded, maybe temporarily, however without having a substantial amount of pyrolysis during presence of the mass within the screw arrangement.

On the other hand, the prevailing pressure influences the temperature level at which breaking of carbon-carbon bonds starts. At a higher pressure, this temperature level will be higher than at a lower pressure. Consequently, sufficiently increasing the pressure by the screw arrangement ensures that the mass can highly be heated and destabilized, while preventing that substantial pyrolysis would already occur. In addition, the threshold value is also influenced by the prevailing atmosphere, for example an oxygen-rich atmosphere versus an inert atmosphere under nitrogen. In one embodiment, nitrogen is injected into the screw arrangement, near the output or at multiple locations, and/or in the connection to the reactor to prevent ignition. The threshold value is typically higher in an inert atmosphere than in an oxygen-rich atmosphere.

Due to the fact that the mass is brought in the aforementioned extreme, unstable, or critical condition by the screw arrangement, as soon as the pressure drops when leaving the screw arrangement, pyrolysis will occur. Thus, degradation already starts in the connection between the screw arrangement and the reactor, as a result of the pressure drop or expansion after leaving the screw arrangement. The expansion involves a pressure drop from the exit pressure at the exit of the screw arrangement to a lower pressure value. This lower pressure value may be the reactor pressure, in case a direct connection is provided between the screw arrangement and the reactor, or it may be the pressure in a buffer tank, if such a buffer tank is present between the screw arrangement and the reactor. Due to pyrolysis during the expansion in the connecting element, gaseous hydrocarbons are formed, for example occurring as gas bubbles in the melted mass in the connecting pipe. The pyrolysis during the expansion involves an abrupt change of state of the material, as a fast pyrolysis occurs comparable to a flash pyrolysis. As the connecting element has a closed wall or sleeve, the gas bubbles included in the molten mass are carried by the flowing medium towards the reactor or buffer tank.

In case of presence of a buffer tank, the buffer tank may comprise arrangements to evacuate the already formed gaseous hydrocarbons for further processing. In case of a direct connection, the gases being formed in the connecting pipe arrive in the reactor, where they can be evacuated for further processing. Moreover, components in the mass that were already close to degradation at the exit of the screw arrangement, will disintegrate very quickly when being fed into the reactor, where the pyrolysis temperature prevails. Other components in the mass that were not yet close to degradation when leaving the screw arrangement, will still require a certain warming-up inside the reactor before disintegrating.

Finally remark that the above-mentioned threshold value, and the occurrence of pyrolysis, refers to the breaking of carbon-carbon bonds. The breaking of other bonds, for example bonds between carbon and halogens, will typically already be initiated during destabilization of the mass in the screw arrangement. For example, typically halogens will be released within the screw arrangement, which can be evacuated as HCl vapors via an outlet port.

In summary, the method is characterized by an occurring pyrolysis during the expansion in the connecting element, this being a prove that the targeted extreme condition was reached in the screw arrangement. In other words, whenever no such formation of gaseous hydrocarbons occurs in the connecting element, this means that the targeted extreme condition was not realized by the screw arrangement, the latter thereby not being maximally exploited.

Establishing the aforementioned extreme condition by the screw arrangement, results in the screw arrangement being optimally exploited and the complete process being optimized. The latter implies maximal advantages with respect to capacity, energy efficiency and quality, as will be further explained underneath.

Indeed, a first advantage of the invention is an improved energy and time efficiency. First, due to the extreme condition being reached at the exit of the screw arrangement, substantial degradation will start very quickly after feeding into the reactor; no significant heating is needed anymore in the reactor before the actual degradation starts. In other words, the reactor is only used for its intended purpose, that is, for pyrolysis, and not for an inefficient preheating. Moreover, because the mass is already heated up strongly within the screw arrangement, it is already in a liquid state upon introduction into the reactor. Such a liquid state is optimal for a good heat transfer inside the reactor, since good contact with the wall is possible at all places of the wall, and since heat can be transported well through the mass. Finally, for the transition from a waste material consisting of solid pieces to a molten state, the use of a screw arrangement is the most efficient way of achieving the necessary heat supply. Indeed, in the solid and viscous state of the mass, the friction or shear realized forms an efficient way of heating the mass, and there are few surfaces present within the screw arrangement along which heat losses can occur. Also, the mass present within the screw arrangement is compacted, so that air present between the fragments of waste material and hindering the heat transfer is removed. As a result, the necessary heat to be supplied to the mass is distributed most efficiently between the screw arrangement and the reactor. This contributes on the one hand to a shorter residence time in the reactor, and thus an improved time efficiency, throughput and production capacity. On the other hand, this contributes to an improved energy efficiency, in which overall less energy is required in order to convert the original waste material into pyrolysis products. The method according to the invention thus provides a time and energy efficient solution for any type of reactor. No special type of reactor or a special design of the reactor is required, even the simplest form of reactor, such as a reservoir or container is sufficient.

Another advantage of the invention concerns an improved quality of the pyrolysis products. This quality improvement is situated on several levels. First, because the mass is fed into the reactor at the highest possible temperature, the residence time in the reactor is lower. As a result, less re-cracking of pyrolysis products will occur, so that a larger fraction of condensable hydrocarbons with longer chains is created. The condensable hydrocarbons are typically the desired products, for example for use as liquid fuel. Secondly, when use is made of a reservoir as a reactor, and it is used in a continuous mode, then the maximum heating up in the screw arrangement results in a smaller temperature difference between the new material that is fed into the reactor and material already present in the reactor. In this way, an ongoing pyrolysis in the reactor is less disturbed by feeding new material at lower temperature. This ensures a more homogeneous temperature distribution within the reactor, and as such less spread in the resulting products, with a peak at the desired final products. This also ensures that components that are difficult to crack will degrade within a limited residence time in the reactor. Finally, there is a quality improvement in the field of reduction of pollutants in the pyrolysis products. Indeed, as the mass in the screw arrangement is heated to a high temperature, dewatering and dehalogenation will take place already here. The resulting vapors can be easily vented from the screw arrangement through an outlet port, so that these pollutants are not entrained in the reactor, and they do not end up in the pyrolysis products. It is even possible to use the screw arrangement as a quality control, and if an excessive presence of, for example, chlorine is found in the vapors released from the screw arrangement, to isolate the charge of waste material and not process it further in the reactor.

Finally, the method according to the invention is advantageous in terms of realized yield. First, the invention causes the screw arrangement to be maximally used, but still preventing substantial pyrolysis to occur in the screw arrangement. In this way, it is avoided that too much gaseous hydrocarbons would already be formed in the screw arrangement, where they cannot be recovered. Secondly, hydrocarbon vapors that are released in the connecting element, are carried with the mass until reaching the reactor, where they can be recovered in the common way. In other words, it is possible to operate the screw arrangement at a critical, optimal condition, with pyrolysis during the subsequent expansion, while preventing that gaseous hydrocarbons released during the expansion would be lost. Finally, an important aspect that influences the yield is the occurrence of carbonization on the reactor wall: if a particle of mass sticks to the reactor wall and local overheating occurs there, this mass is carbonized, so that the yield of volatile hydrocarbons decreases. In view of the well-liquid state of the mass upon introduction into the reactor, there is optimum contact with the mass at all locations of the reactor wall. In this way it is avoided that the reactor wall cools unevenly, that overheating occurs locally, and that these hot spots give rise to carbonization during subsequent contact with waste material. This not only contributes to an improved yield, but also prevents ash particles from being entrained and thus contaminating the pyrolysis products.

In summary, the abovementioned advantages are obtained when the process is designed in such a way that in the screw arrangement the targeted extreme condition is reached, characterized by pyrolysis during expansion in the subsequent connecting element. In other words: in a process out of the scope of the invention, that extreme condition is not realized by the screw arrangement, such that a too large safety margin is taken and start of pyrolysis is delayed too much. In the latter case, the mentioned advantages are not obtained or to a lesser extent.

Enabling to reach the abovementioned extreme condition, in the first place requires a suited design and dimensioning of the screw arrangement; the design of the screw(s) and barrel and selection of drive parameters need to be such that the required combination of exit pressure and exit temperature can be delivered. In this, another design may be required depending on the type of waste material, e.g. plastics versus rubber. Optionally, the method also comprises appropriately setting of the screw arrangement. This involves selecting a particular setting for the screw arrangement. For example, the setting may depend on the composition of the mass, thus on which type of waste material is pyrolyzed. This does not mean that limited variations over time in the composition, because of the heterogeneity in the waste mix, always give rise to new settings of the screw arrangement. It does mean that when switching to a different type of waste material, for example PE plastic versus rubber, the screw arrangement is set differently. In other words, the screw arrangement is set based on an average composition of the waste material. Setting the screw arrangement refers to adjusting the operating conditions. For example, the screw arrangement is set by adjusting a parameter indicative of a screw speed, and/or a motor power, and/or a heating of the wall of the screw arrangement, and/or a heating of a screw of the screw arrangement. A parameter indicative of a screw speed is, for example, a speed of revolution or rotational speed of the one or more screws of the screw arrangement. A parameter indicative of a motor power refers to a power of the drive motor of the screw arrangement, expressed in absolute figures, as a percentage of a maximum or nominal power, etc. For example, a parameter indicative of a heating of the screw arrangement wall refers to a setting of the external heat source which is responsible for heating the drum wall of the screw arrangement. Another example is the distribution of the heat supply between different zones on the drum wall. A parameter indicative of a heating of a screw of the screw arrangement refers, for example, to the control of an external heat source or heating medium, for example heated oil, which is responsible for heating the one or more screws present in the screw arrangement.

In one embodiment, the screw arrangement is set empirically for reaching the extreme condition. For example, the settings of the screw arrangement are gradually varied to detect when the breaking of carbon-carbon bonds, with release of volatile hydrocarbons, is initiated in the connecting element. In another embodiment, the setting of the screw arrangement is based on a measurement that detects the release of volatile hydrocarbons in the screw arrangement.

In one embodiment, the setting of the screw arrangement is via a control unit, for example the screw arrangement comprises an input screen for entering setting parameters and a controller or PLC for setting the screw arrangement accordingly. In one embodiment, determining the optimal setting of the screw arrangement, and/or determining a desired output temperature, takes place in a computing unit such as a computer, controller or PLC.

Optionally, increasing the pressure through the screw arrangement is such that during the heating in the screw arrangement pyrolysis of the mass is avoided, or such that at most 1% mass percentage of the hydrocarbons present in the mass at the entrance of the screw arrangement is converted into gaseous hydrocarbons during the heating in the screw arrangement. This means that of the mass hydrocarbons present at the entrance of the screw arrangement, at most 1% evaporates during the stay in the screw arrangement. This fraction typically leaves the screw arrangement via an outlet port on the screw arrangement. The other hydrocarbons leave the screw arrangement as a molten mass via the exit of the screw arrangement, where they arrive in the connecting element. This implies that the screw arrangement is working up to an extreme condition, wherein it is even possible that a first, limited evaporation of hydrocarbons takes place in the screw arrangement itself. In this, a trade-off is to be made between on the one hand ensuring that the extreme condition is reached, involving maximal advantages with respect to capacity, energy efficiency and quality, and on the other hand minimizing the amount of gaseous hydrocarbons already formed in the screw arrangement and difficult to recover.

Optionally, the gaseous hydrocarbons released during the heating in the screw arrangement, leave the screw arrangement via one or more outlet ports on the screw arrangement. For example, the screw arrangement is provided with an additional outlet port, specially intended for evacuating hydrocarbon vapors. In another embodiment, use is made of an outlet port through which also gaseous halogens are leaving the screw arrangement.

Optionally, the method further comprises:
evacuating water vapor, being released from the mass during the heating in the screw arrangement, via a first outlet port on the screw arrangement;
evacuating gases comprising halogens, being released from the mass during the heating in the screw arrangement, via a second outlet port on the screw arrangement;
evacuating gaseous hydrocarbons, being released from the mass during the heating in the screw arrangement, via a third outlet port on the screw arrangement.

This means the three different outlet ports are present on the screw arrangement, through which released vapours can leave the screw arrangement. Typically, evacuation of water vapour happens via the first outlet port, situated in the most upstream position. By means of the second outlet port, positioned closer to the exit, gases comprising halogens leave the screw arrangement. Indeed, when the waste material contains halogens, such as, for example, chlorine or bromine, then, typically, the breaking of bonds between carbon and halogens occurs at a lower temperature level than the breaking of bonds between carbon atoms. As a result, dehalogenation occurs during the residence of the mass inside the screw arrangement, with halogens, for example in the form of chlorides or bromides, leaving the screw arrangement through the second outlet port. The release of halogens from the screw arrangement has the advantage that these pollutants are not entrained in the reactor, and they do not end up in the pyrolysis products. It is even possible to use the screw arrangement as a quality control, and if an excessive presence of, for example, chlorine is found in the vapors released from the screw arrangement, to isolate the charge of waste material and not process it further in the reactor. The third outlet port, being in the most downstream position, is specially provided to allow hydrocarbons which already evaporate during the residence in the screw arrangement, to leave the screw arrangement. It is nonetheless possible that at the second and/or third outlet port, a combination of gaseous halogens and gaseous hydrocarbons leave the screw arrangement. Providing a third outlet port, allows the screw arrangement to be used in an extreme condition, wherein even in the screw arrangement a limited evaporation of hydrocarbons occurs.

Optionally, the connecting element provides a direct connection between the screw arrangement and the reactor, and the pressure drop is from the exit pressure to a reactor pressure lower than the exit pressure. For example, the screw arrangement realizes an exit pressure between 50 bar and 80 bar, and the reactor pressure is a value between 1 bar and 10 bar. In another embodiment, the connecting element provides a connection between the screw arrangement and a buffer tank placed between the screw arrangement and the reactor, and the pressure drop is from the exit pressure to a pressure in the buffer tank lower than the exit pressure.

Optionally, the method comprises transporting the mass through the connecting element, wherein the gaseous hydrocarbons formed during the pressure drop, are carried by the mass flowing towards the reactor or towards the buffer tank. The connecting element, for example a pipe or one or more tubes, thus has two open ends and a closed wall or sleeve. The gas bubbles present in the molten mass are thus carried through the pipe and can only leave the pipe via the second open end.

Optionally, the gaseous hydrocarbons formed in the connecting element during the pressure drop, occur as gas bubbles present within the melted mass. Thus, the pyrolysis occurring during the expansion involves a sudden state change, wherein gas bubbles arise in the molten mass. Potentially, this may involve foaming of the mass. The presence of gas bubbles in the mass may for example be visually observed, in the connecting element, or where the connecting element discharges into the reactor or a buffer tank.

Optionally, the pressure difference between the exit pressure and the lower pressure causes the mass to flow, thereby transporting the mass through the connecting element. This means that the transfer through the connecting element takes place without using driven arrangements. Instead, use is taken of the increased pressure at the exit of the screw arrangement, which pushes the mass into the connecting element. In other words, a flow transport takes place towards the reactor, of the molten viscous mass including gas bubbles.

Optionally, the waste material consists for at least 80% of its mass percentage of PolyEthylene and/or PolyPropylene, and the exit temperature at the exit of the screw arrangement is higher than 330° C., preferably between 340° C. and 380° C. For example, the exit temperature is 350° C. The waste material is thus a mix of plastic, mainly PE (PolyEthylene) and PP (PolyPropylene). In addition to PE and PP, the waste material also comprises pollution, for example inert materials such as glass, sand, Aluminum, . . . , organic waste, traces of PVC, etc. With this composition of the waste material, the screw arrangement is designed and set in such a way that the exit temperature is higher than 330° C., preferably between 340° C. and 380° C., for example 350° C.

Optionally, the reactor is a reservoir adapted to be filled to a filling level with the mass, wherein inside the reservoir
- a mixing arrangement is present adapted to mix the mass inside the reservoir, or no such mixing arrangement is present;
- no arrangement is present for transporting the mass through the reservoir.

This means that a type of reactor is considered in the form of a reservoir or container with a certain filling capacity. It is thus a type of fixed bed reactor, where the mass is not transported through the reactor. Such type of reactor is also referred to as a batch reactor, although this type of reactor can be used in bath as well as continuously. In one embodiment it is possible that there is movement of the mass present relative to the reactor wall as a result of mixing inside the reservoir. For example, it is a vertically arranged reservoir with a central stirring rod, or a horizontally arranged reservoir with mixer. Inside the reactor, typically no arrangement is present for heating the mass via a surface different from the reactor wall. The heating of the mass therefore only takes place via the reactor wall, not via, for example, a heated screw inside the reactor. The reactor can be operated in different ways, for example in batch, in continuous mode or in semi-continuous mode. Semi-continuous mode refers to alternating between a continuous mode and batch mode. The use of such a type of reactor has the advantage that the reactor is simple and robust, which makes it cheaper, reliable and maintenance friendly. Indeed, no parts are required to realize a transport of the mass through the reactor. This type also has the advantage that good control over the temperature is possible, and the temperature can be controlled to achieve the most complete degradation possible for all mass present. Finally, with this type of reservoir reactor, in which a bulky reservoir is filled with a large mass of material, the problem arises that it takes time to transfer the heat from the reactor wall to everywhere in the mass. The use of a screw arrangement up to an extreme condition then results in good energy and time efficiency, even when this simple type of reservoir reactor is used.

Optionally, the mass is continuously mixed and moved along the reactor wall during the thermal degradation by means of the mixing arrangement present inside the batch reactor. This means that the reactor comprises a mixing arrangement placed inside the reactor wall. The mixing arrangement is such that it ensures mixing of the mass and movement of the mass along the reactor wall. For example, it concerns a horizontally arranged reactor containing a mixer comprising blades mounted on a horizontal axis, with certain blades scraping along the reactor wall. The use of such a mixing arrangement has the advantage that during the pyrolysis, the mass is continuously mixed, which results in a homogeneous temperature distribution within the mass and consequently a large fraction of desired pyrolysis products. In addition, mass adhering to the wall is continuously loosened again, so that carbonization is avoided. This results in a higher yield and avoids ash particles being entrained in the pyrolysis products.

Optionally, at least during part of the time, new mass is fed into the reactor during the thermal degradation of other mass already present in the batch reactor, with mixing of the new mass and the other mass. This means that the reactor is a reservoir or container in which pyrolysis takes place, while new mass is fed into the reservoir in the meantime. The reactor can be operated in continuous mode, or in semi-continuous mode. When feeding of new mass into the reservoir, this new mass is mixed with the other mass already present. The new mass is at a temperature close to the exit temperature obtained at the exit of the screw arrangement. In these circumstances, it is advantageous that the new mass is fed at a temperature as high as possible, wherein the present other mass is at a higher temperature than the new mass, but the temperature difference between both is limited. This limited temperature difference has the advantage that the ongoing pyrolysis of the other mass present is minimally disturbed when new mass is fed at a lower temperature. In this way, components present in the mass that are difficult to degrade can still be pyrolyzed within a reasonable residence time. Also, the heat already present in the reactor is used to rapidly degrade the newly supplied mass.

Optionally, the batch reactor is operated alternately in continuous mode and in batch mode, wherein: in the continuous mode, mass is continuously fed into the reactor during the thermal degradation, and in the batch mode, no mass is fed into the reactor during the thermal degradation.

This means that part of the time new mass is fed into the reactor while pyrolysis of other mass present in the reactor is already underway. Another part of the time pyrolysis is in progress in the reactor, without new mass being added at the same time. Thus, the reactor is operated part of the time in continuous mode and part of the time in batch mode, alternating between the two modes. Such mode of use is also referred to as a semi-continuous or semi-batch process. The advantage of such an alternation between continuous and batch mode is that during the continuous mode components that crack easily and are already close to degradation are converted into pyrolysis products immediately after feeding into the reactor. On the other hand, components that are difficult to crack, and require a high temperature for this, get the chance to degrade during the batch mode. After all, during this batch mode there is no disturbance of the temperature as a result of newly supplied mass. This results in an optimal combination of capacity on the one hand and quality of the pyrolysis products on the other. Remark that in case of a direct connection between the screw arrangement and the reactor, during the batch mode no transport of the mass through the connecting element takes place. At that time, the molten mass remains stationary inside the connecting pipe, such that provisions may be needed to avoid that the mass solidifies or sticks to the inner surface of the connecting pipe. Conversely, during the continuous mode the molten mass is moved forward through the connecting pipe.

In one embodiment, the continuous mode is switched to the batch mode in the case of a preset fill level reached in the reactor, and the batch mode is ended when no formation of volatile hydrocarbons occurs.

Optionally, during the thermal degradation the reactor wall is heated such that inside the reactor a pyrolysis temperature prevails higher than the aforementioned exit temperature, preferably 50° C. to 150° C. higher than the exit temperature. This means that the mass inside the screw arrangement is heated to an exit temperature close to degradation. Inside the reactor, however, an even higher temperature prevails, that is, the pyrolysis temperature. This means that components in the mass that are already close to degradation at the output of the screw arrangement, immediately degrade when fed into the reactor, forming volatile hydrocarbons. On the other hand, other components in the mass will first heat up further to the pyrolysis temperature in the reactor and then start to degrade. In this way, the most complete degradation possible is obtained, and this within a short residence time in the reactor.

In one embodiment, the waste material consists for at least 80% of its mass percentage of PolyEthylene and/or PolyPropylene, and the pyrolysis temperature remains at least during part of the time between 400° C. and 450° C., preferably between 410° C. and 430° C., for example 420° C.

Optionally, the pyrolysis temperature in the reactor is higher during the batch mode than during the continuous mode, preferably 60° C. to 100° C. higher. In one embodiment, the reactor wall temperature is controlled to a higher value during the batch mode than during the continuous mode. In another embodiment, the same temperature of the reactor wall is maintained during the continuous and batch mode, and the higher pyrolysis temperature arises in the reactor during the batch mode, since no new mass at a lower temperature is fed into the reactor. Such a difference in the pyrolysis temperature during the continuous and batch mode has the advantage that during the continuous mode components in the mass that are already close to degradation when fed into the reactor quickly crack in the reactor, without much risk of re-cracking. The pyrolysis temperature is thus sufficiently high, but not too high, to avoid the formation of many chains of short length. On the other hand, components that are difficult to crack are given the chance to heat up extra during the batch mode, and in this way to also degrade in a limited time.

In one embodiment, the waste material consists for at least 80% of its mass percentage of PolyEthylene and/or PolyPropylene, and the pyrolysis temperature during the batch mode is between 400° C. and 450° C., preferably between 410° C. and 430° C. and the pyrolysis temperature during the continuous mode is between 460° C. and 550° C., preferably between 490° C. and 510° C., for example 500° C.

According to a second aspect of the present invention, the above-identified objects are achieved by a system for pyrolysis of a mass of waste material comprising:

a screw arrangement adapted to:
supply heat to the mass, at least in part by mechanical shear, so that the mass present in the screw arrangement is heated to an exit temperature, wherein the mass is at least partly melted, and to increase the pressure of the mass, to an exit pressure at the exit of the screw arrangement;
a connecting element connected to the exit of the screw arrangement;
a reactor placed after the connecting element, adapted to supply heat to the mass in the absence of oxygen by heating the reactor wall with an external heat source, so that the mass present in the reactor thermally degrades, whereby carbon-carbon bonds in the mass are broken by pyrolysis and volatile hydrocarbons are formed,
wherein:
the screw arrangement is adapted to bring the mass in an extreme condition at the exit pressure and the exit temperature, such that during an expansion of the mass in the connecting element pyrolysis occurs, thereby forming gaseous hydrocarbons in the connecting element;
the screw arrangement comprises three different outlet ports, adapted to evacuate water vapor, gases comprising halogens, and gaseous hydrocarbons from the screw arrangement;
the connecting element comprises a closed wall and is adapted to transport the mass comprising gaseous hydrocarbons formed during the expansion, by allowing the mass to flow through the connecting element in presence of the exit pressure.

The system according to the invention thus comprises a screw arrangement, a connecting element and a reactor. The screw arrangement, the connecting element and the reactor are defined as described above. In particular, the screw arrangement is designed and dimensioned in such a way that it allows to heat the mass up to an exit temperature and to increase the pressure up to an exit pressure, such that an extreme condition is reached at the exit of the screw arrangement. The extreme condition is defined as described above. In particular, the extreme condition is such that during expansion in the connecting element, after leaving the screw arrangement, pyrolysis occurs. The screw arrangement further comprises three different outlet ports, typically arranged at different length positions. The length direction is the direction of moving forward through the screw arrangement. The outlet ports are adapted to let escape any vapors being formed from the mass during residence in the screw arrangement. Those vapors are e.g. water vapor, gases comprising halogens and gaseous hydrocarbons being already formed inside the screw arrangement. Finally, the connecting element has a closed wall, such that gaseous hydrocarbons formed during expansion in the connecting element, are carried along until reaching the reactor or a buffer tank. Moreover, the connecting element is such that the molten mass including gaseous hydrocarbons can flow through the connecting element, such a flow being driven by the pressure difference between the screw arrangement exit and the lower pressure in the reactor or a buffer tank.

Optionally, the connecting element comprises one or more pipes, wherein the inner surface of the one or more pipes is provided with a coating having anti-sticking properties, said coating being adapted to reduce sticking of the mass to the inner surface. Inside the connecting element, the mass is in a viscous, slimy or syrupy state. Because of that, the mass is sticky and tends to stick to a surface, in particular to the inner wall of the connecting pipe. Providing a coating with anti-stick properties has the advantage that the tendency of sticking is reduced or eliminated, thereby allowing the mass to slide over the coated surface. In an embodiment, the coating comprises glass, or it is a glass-like coating applied as a layer onto the surface. Due to the presence of the coating, flowing of the mass in the connecting pipe is facilitated, and it is avoided that over time mass would attach to the inner surface of the pipe, thereby hampering the transfer of subsequent mass. Obtaining a fluent flow of the mass inside the connecting element is not straightforward due to the non-uniform condition of the mass. Indeed, due to pyrolysis occurring in the pipe, the mass comprises on the one hand a molten portion, including long and short chains, and on the other hand gaseous hydrocarbons, e.g. gas bubbles present in the molten mass. The gas bubbles thus result in a volume increase, and the non-uniform behavior of the mass hampers the creation of a uniform flow towards the reactor. In existing solutions, where merely a molten mass is present, it is easier to establish such a uniform flow. Thus, the presence of the coating contributes to creating, even when having a mass in non-uniform state, an unimpeded flow towards the reactor, thereby carrying the present gas bubbles to the reactor. Finally, when using a batch process, or a semi-batch process, the risk of sticking is even increased: every time the mass is stationary in the connecting pipe, there is a risk of sticking of parts of the mass to the wall; the presence of a coated surface is then even more important to mitigate that risk.

Optionally, the system comprises a measurement adapted to detect gaseous hydrocarbons being released from the mass in the screw arrangement. In one embodiment, a measurement that detects the release of volatile hydrocarbons in the screw arrangement is a measurement that monitors the composition of the vapors leaving the screw arrangement through an outlet port. Such an outlet port may be present to allow for dehalogenation, or an additional outlet port may be present. In another embodiment, use is made of a measurement which allows to determine the presence of condensed hydrocarbons at a surface in or around the screw arrangement, resulting from released volatile hydrocarbons. Such a measurement allows to check whether the process is operated under the desired, optimal conditions. Indeed, on the one hand a release of a limited amount of hydrocarbon vapors in the screw arrangement indicates that the screw arrangement is operating in the targeted extreme condition. On the other hand, detection of too much of such hydrocarbon vapors indicates that the yield of pyrolysis products will be adversely affected. An adjustment, for example of the settings of the screw arrangement, may then be required.

DETAILED DESCRIPTION OF THE EMBODIMENTS

Figure 1:
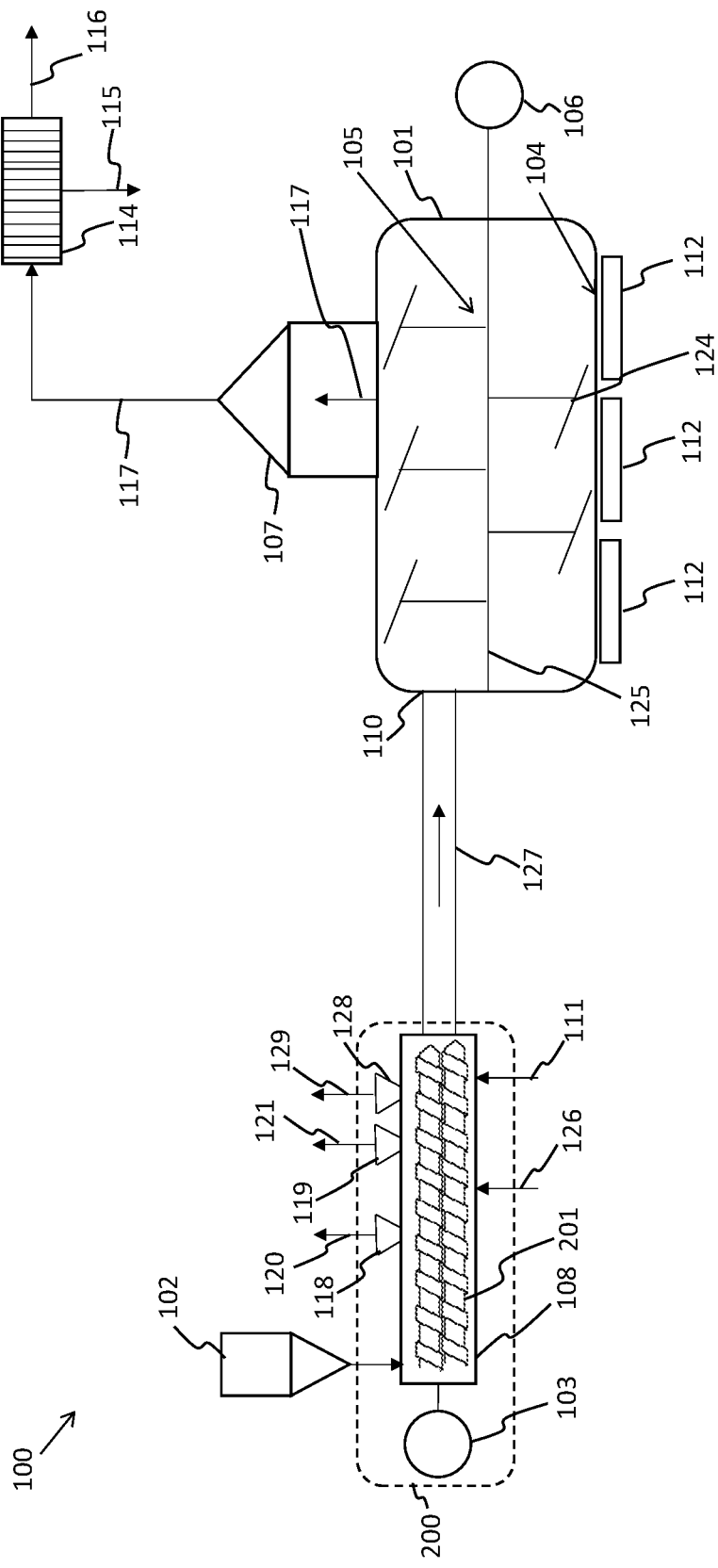
FIG. 1 and FIG. 2 each illustrate a system, according to an embodiment of the invention.

FIG. 1 illustrates the elements present in a system 100 according to an embodiment of the invention, and the steps included in the corresponding method. The system 100 comprises a screw arrangement 200, and a reactor 101. The screw arrangement 200 is connected to the reactor 101 via a connecting element 127. In the illustrated embodiment, the screw arrangement 200 is a twin-screw extruder comprising a twin screw 201, inside a drum 208 and driven by a motor 103. In another embodiment, another type of screw arrangement is possible, for example with a single screw. A mass of waste material can be fed into the screw arrangement 200 via an input 102. The waste material is, for example, a mixture of plastic waste, in which various types of plastic may be present, for example PE (Polyethylene), PP (Polypropylene), PVC (Polyvinyl chloride), PET (Polyethylene terephthalate), PS (Polystyrene), etc. Other examples of waste material are organic waste, food residues, offal, animal feed, rubber, wood, textiles, etc. A certain pre-processing of the original mix of waste material can possibly be taking place. For example, plastic waste may first undergo a selection, or may be converted to pellets before entering the input 102. Inside the screw arrangement, the supplied mass is advanced, pressurized and heated by turning the screws 201. In the embodiment shown, warming takes place purely by mechanical shearing, as a result of friction created by the turning of the screws 201 inside the drum 208. However, other embodiments are possible, for example, wherein the drum wall 208 is heated by means of an external heat source, or wherein the screws 201 are heated. During the heating in the screw arrangement, the supplied mass of waste material melts.

In the shown embodiment, the connecting element 127 is a pipe, having a closed wall and two open ends, that connects the exit of the screw arrangement 200 to the reactor 101. The pipe 127 is thermally isolated, such that heat loss from the mass towards the environment is limited. Possibly also an external heat source is used, to supply heat towards the pipe, such that the mass in the pipe doesn't cool down and even may be slightly heated up during the transport in the connecting pipe 127. In the shown embodiment, mass leaving the screw arrangement is pushed into the connecting pipe 127, such that the mass flows towards the reactor 101. In another embodiment, a pump may be used to convey the mass towards the reactor 101.

In the embodiment shown, the reactor 101 is a batch type reactor, comprising a reservoir or container that can be filled to a certain filling level, and where there is no transport of the mass through the reactor. In the embodiment shown, the reactor 101 is a horizontal reactor, which can be arranged flat or with a certain inclination relative to the ground level. The reactor 101 comprises a cylindrical reservoir, with a reactor wall 104. An electrical heater, consisting of several segments 112, is present to heat the reactor wall 104. The heating elements 112 are shown in FIG. 1 purely schematically. Heating the reactor wall provides the supply of heat to the mass contained inside the reservoir. This happens in the absence of oxygen, so pyrolysis takes place. A mixing arrangement 105 is present in the cylindrical reservoir, which is driven by means of a motor 106. In the embodiment shown, the mixing device 105 is a plowshare mixer, schematically represented in FIG. 1. The mixer 105 includes a shaft 125 on which blades 124 are mounted. Driving the shaft 125, via the motor 106, causes the blades 104 to move along the reactor wall 104. When a content is present inside the reservoir, the content is mixed by this movement, and reactor content in the vicinity of the wall 104 is set in motion. In other embodiments, other types of mixing arrangements are possible, or no such mixing arrangement is present.

One or more input ports 110 are present on the reactor 101, adapted for feeding mass into the reactor 101, as shown schematically in FIG. 1. In one possible embodiment, there is also an input to add a catalyst or auxiliary material into the reactor 101. Typically, a discharge port is also present to discharge ashes and any optional catalyst or auxiliary material from the reactor. For monitoring the process, a thermometer and/or pressure meters are present to measure the temperature of the reactor contents or the pressure inside the reactor 101, respectively. A scale may also be present to measure the weight of the reactor 101 and thus monitor the amount of waste material to be pyrolyzed inside the reactor. At the top of the reactor 101, the gaseous pyrolysis products 117, which are formed by pyrolysis of the waste material inside the reactor 101, are collected, see 107.

Typically, the system 100 is part of a petrochemical installation. Such installation includes the arrangements for further treating and converting the pyrolysis products 117, which are derived from the reactor 101. Known technology can be used for this. In FIG. 1 a cooling arrangement 114 is represented schematically, adapted to convert via cooling the condensable hydrocarbons present in the pyrolysis products 117, for example in the range from C5 to C45, into liquid products 115. The non-condensable hydrocarbons in the pyrolysis products 117, in the range from C1 to C4, result in gaseous products 116. The cooling arrangement 114 may comprise multiple installations, such as different types of heat exchangers, a quench column, etc.

In the illustrated embodiment of FIG. 1, the screw arrangement 200 includes an input port 111 and 126. For example, the input port 111 is used to inject nitrogen, for creating an inert atmosphere inside the extruder 108. For example, the input port 126 is used to inject hydrogen into the extruder 108, so as to bind released halogens such as Chlorines and form hydrogen chloride. An outlet port 119 is also present on the extruder 108 through which hydrogen chloride vapors can leave the extruder 108. Located at a length position closer to the input 102, an outlet port 118 is also present, through which water vapor that forms inside the extruder 108 can escape during heating. In this way, the drying of the polymer present inside the extruder 108 is promoted. Finally, at a length position closest to the exit of the screw arrangement 200, a third outlet port 128 is present, through which hydrocarbon vapors, which are formed to a limited extent during residence of the mass in the extruder 200, can be evacuated. Additionally, hydrogen chloride vapors may leave the extruder 200 via the third outlet port 128.

Figure 2:
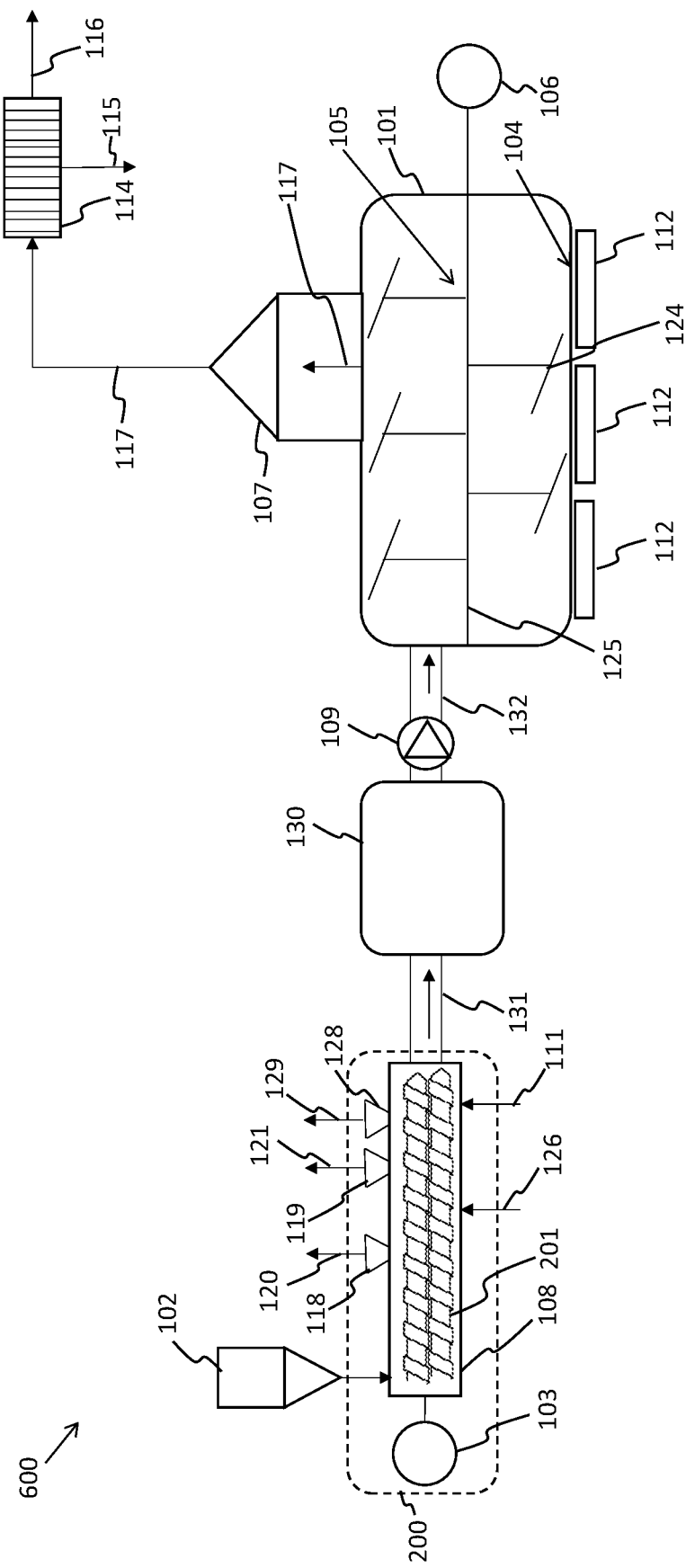

FIG. 2 shows another embodiment of the system 600. The system 600 comprises a buffer tank 130, placed between the screw arrangement 200 and the reactor 101. A connecting element 131, for example a pipe, connects the exit of the screw arrangement 200 with the buffer tank 130. In the buffer tank 130 the mass may be temporarily stored before feeding into the reactor 101. In the shown embodiment, the transfer towards the reactor is done by means of a pump 109, via a second connection 132.

Figure 3:
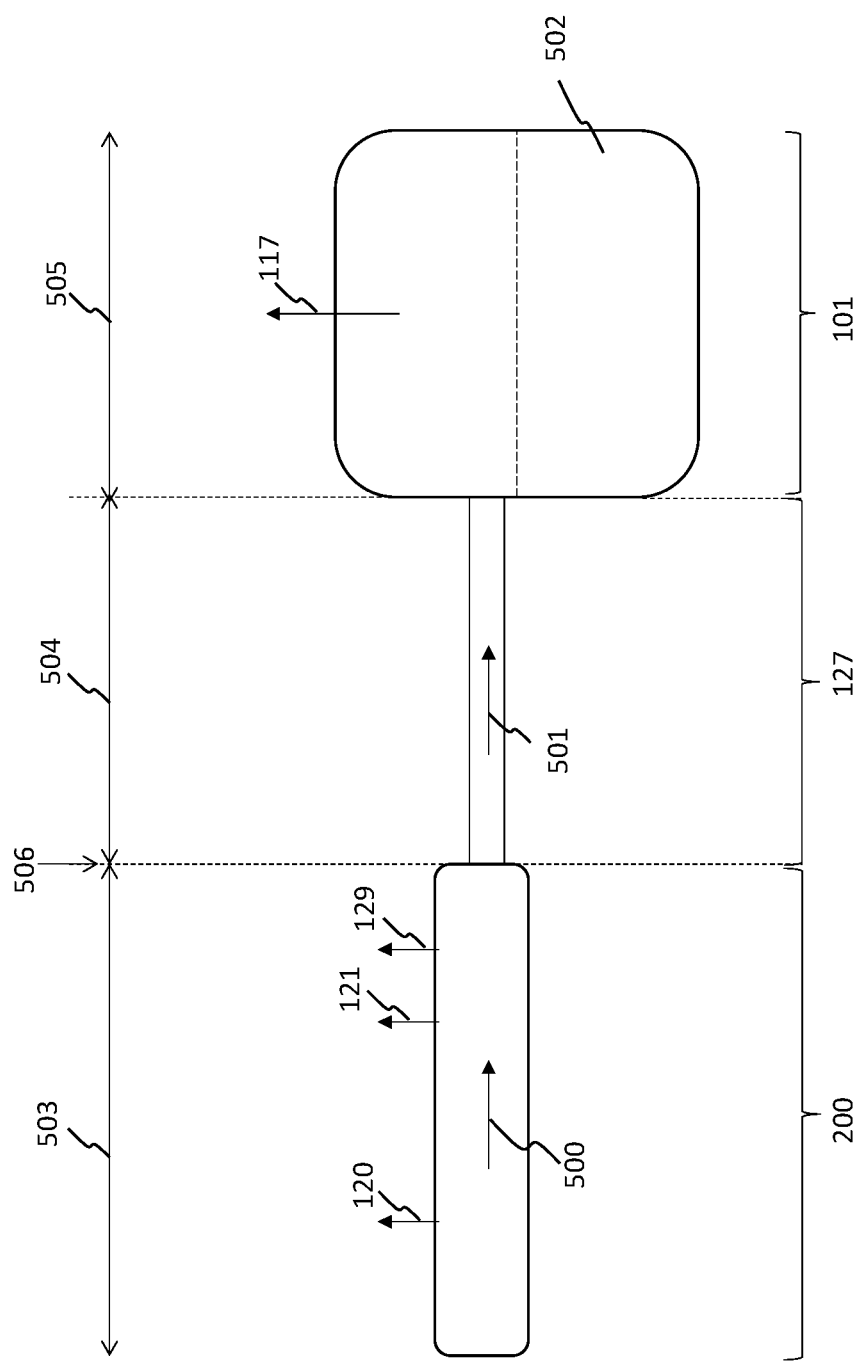
FIG. 3 schematically illustrates the steps present in a method according to the invention.

FIG. 3 illustrates schematically the different step of the method according to the invention. The steps as shown in FIG. 3 are executed by means of a system 100 as presented in FIG. 1. Roughly spoken, the method may be divided into three successive stages, each time involving a substantial change in the state of the mass to be pyrolyzed.

In a first stage, 503, the mass is transferred through the screw arrangement, see 500. On the one side, during this stage the mass is heated to an exit temperature, thereby being melted. On the other hand, pressure is built up as the mass moves towards the exit of the screw arrangement, up to an exit pressure. This results in reaching an extreme condition 506 at the exit of the screw arrangement. This extreme condition is such that during the residence in the screw arrangement 200, an important amount of heat is supplied to the mass, but still substantial pyrolysis in the screw arrangement 200 is avoided, due to the increased pressure. It is possible that during residence in the screw arrangement 200, a limited amount of hydrocarbon vapors is formed. For example, at most 1% of the hydrocarbons present in the supplied waste material, may evaporate during residence in the screw arrangement 200. Those gaseous hydrocarbons 129 can be evacuated from the screw arrangement via a third outlet port 128. Possibly, a measurement is present that detects to which extent hydrocarbon vapors 129 are being formed in the screw arrangement 200. During heating in the screw arrangement 200, also water vapor 120 and hydrogen chloride vapors 121 are formed, which leave the screw arrangement via outlet ports 118 and 119 respectively.

At the end of the first stage 503, close to the exit of the screw arrangement 200, the molten mass is in an unstable, critical condition. After leaving the screw arrangement 200, the mass arrives in the connecting element 127. Because of the high pressure at the exit of the screw arrangement, the mass is being pushed into the connecting pipe 127, thereby causing a flow transport through the pipe 127, see 501. Moreover, in the connecting element 127 an expansion is taken place. During the expansion the pressure decreases from the exit pressure reached at the exit of the screw arrangement 200 to a lower pressure prevailing in the reactor 101. Because of the unstable condition of the mass at the exit of the screw arrangement 200, and the sudden pressure drop in the connecting element 127, pyrolysis of the mass occurs. This causes gaseous hydrocarbons to be formed in the mass in the connecting pipe 127, indicated by gas bubbles arising in the molten mass. These gas bubbles are transferred to the reactor together with the molten mass, where they can leave the reactor 101 together with other formed pyrolysis products 117. Because of the non-uniform state of the mass in the connecting pipe 127, a fluent transfer towards the reactor 101 needs to be established and sticking of material to the inner wall of the connecting pipe 127 is to be prevented. For example, for this purpose, the connecting pipe 127 is coated with an anti-sticking coating, for example a layer of glass-like material.

During the transport through the connecting pipe 127, typically a slight temperature change of the material will occur. This may be a limited cooling, due to heat loss via the wall of the pipe 127, or a limited heating, due to heat supply towards the pipe 127 by means of an external heat source. Typically, the pipe 127 is thermally isolated to avoid heat losses as much as possible. Finally remark that the length of the connecting pipe 127 depends on the type of extruder 200 that is being used. When using a twin-extruder, only having a pumping function to a smaller extent, the length of the connecting pipe 127 needs to be limited, in order to ensure a flow transport up to the reactor 101. Because of the same reason, the design of the installation preferably avoids that the mass needs to be transferred to a higher point, e.g. by using a horizontal connecting pipe 127. Conversely, when using an extruder 200 with a single screw, the extruder is better able to push forward the mass, such that a longer connecting pipe 127 can be used.

Finally, after leaving the connecting element 127, the mass arrives in the reactor 101, where the pyrolysis temperature prevails, and the third stage 505 takes place.

Components being close to degradation when leaving the screw arrangement 200, are quickly transformed into hydrocarbon vapors 117. Other components remain some time in the molten condition 502 in the reactor 101 and start to pyrolyze after sufficient heating. Possibly an arrangement is present at the entry of the reactor 101 to ensure a stable pressure within the reactor 101. For example, valves and/or pressure controllers are used to establish a constant reactor pressure, and to ensure that the prevailing conditions in the reactor 101 are not disturbed by what is happening upstream.

Thus, FIG. 3 schematically shows how the process needs to be designed in order to take advantage of the invention. Indeed, the mass is to be brought into an extreme condition by the screw arrangement 200, such that during the subsequent expansion pyrolysis occurs. Realizing that extreme condition has the advantage that a relatively large portion of the required heat is already absorbed by the mass in the screw arrangement. In particular, 60 to 70% of the heat that is absorbed by the mass during the process from entry into the screw arrangement to output of the reactor, is absorbed in the screw arrangement. The remaining 30 to 40% is then absorbed in the reactor. This refers to the heat that is effectively absorbed by the mass to undergo the transformation. In this way, the screw arrangement is maximally deployed, in that part of the warm-up where it can more efficiently realize heat transfer than in a reactor. On the other hand, the high fluidity of the material in the reactor and the good contact with the reactor wall there also provides a more efficient heat transfer. In this way, overall, less energy has to be supplied to the process, for example via the drive of the screw arrangement and the fuel or electrical energy of the reactor heating. This contributes to an improved energy efficiency. Also, the necessary residence time in the reactor, which is a bottleneck in the process, is reduced, which contributes to an improved time efficiency or capacity.

Remark that when a buffer tank 130 is used, like in the embodiment of FIG. 2, the expansion occurs in the connecting element 131 between the exit of the screw arrangement 200 and the buffer tank 130, with a pressure drop from the exit pressure to a lower pressure in the buffer tank 130. Gaseous hydrocarbons being formed during the expansion are transferred to the buffer tank 130. Possibly the buffer tank comprises arrangements to evacuate these gaseous hydrocarbons and to recover them.

We now describe a specific process as performed within an embodiment of the invention. The waste material is a mix of plastic, consisting mainly of PE and PP. The mass percentage of PE and PP together in the mix is at least 80%. The reactor used for pyrolysis is a reactor 101 as described in FIG. 1: a batch reactor with horizontally arranged reservoir, without transporting the mass within the reactor, with the presence of a plowshare mixer 105, and use of electric heating 112. The mass present in the reactor is continuously mixed by means of the mixer 105.

The used extruder 108 is a twin-screw extruder with two screws 201 rotating in the same direction. In particular, use is made of a twin-screw extruder having closely meshing screws 201, which allows to create mechanical shear to a large extent. Such type of extruder is described, for example, in EP0852533. The engine power is in the order of 2 MW at a propeller speed of 850 rpm. The extruder has three injection points through which N2 is injected. Between the extruder and the reactor, there is a pipe, establishing a direct connection between both of them. After the screw arrangement 200, the molten mass is pushed into the connecting pipe 127.

The extruder 200 is designed and set in such a way that at the exit the mass is at a temperature of 350° C. on average. The average refers to an average over time as well as to a spatial average over the cross section. The mass leaving the extruder 108 is almost completely in a molten state. By means of the extruder 200 pressure is increased in the mass, up to about 50 bar at the exit of the extruder. Vapors comprising released halogens leave the extruder through the outlet port 119. Such vapors arise from about 190° C. and dechlorination mainly takes place at a temperature from about 210° C. By means of the third outlet port 128, hydrocarbon vapors leave the extruder 200, typically together with additional hydrogen chloride vapors. The said hydrocarbon vapors are formed due to limited pyrolysis already taking place in the extruder 200. Extraction of those hydrocarbon vapors from the extruder 200 happens when the mass has a temperature of about 330° C. Depending on the specific mix of material, the mass percentage hydrocarbons already evaporating in the extruder is between 0% and 1%. In the last part of the heating, between 330° C. and 350° C. no degassing takes place anymore.

In the described embodiment, the pyrolysis is carried out in a semi-continuous process, with the use of the reactor 101 in continuous mode, in a first stage, and use of the reactor 101 in batch mode in a second phase. The reactor is used at atmospheric pressure. During the continuous mode, new mass 110 is continuously fed into the reactor 101, while pyrolysis of already present mass in the reactor 101 is in progress. The pyrolysis temperature inside the reactor is about 420° C. during the continuous mode. Components present in the mass that degrade at the threshold value start degrading shortly after feeding into the reactor 101, that is, carbon-carbon bonds are broken. This produces pyrolysis products 117, which are gaseous at the prevailing temperature, and are collected in the unit 107. During the pyrolysis, meanwhile, new waste material is continuously supplied via the supply port 110, whereby both the temperature and the weight of material present inside the reactor 101 are monitored. When the feed rate of the waste material exceeds the rate of degradation inside the reactor 101, the level of waste material inside the reactor 101 gradually increases.

When a certain fill level is reached, for example 70% of the reactor is filled, the feeding of new waste material into the reactor 101 is stopped, and the batch mode starts. Typically, at that moment mass is still present in the reactor 101 with mainly components that are difficult to degrade, i.e. which require a higher temperature to break carbon-carbon bonds. The temperature of the mass present inside the reactor 101 increases during the batch mode, further, to about 500° C. In this, the pyrolysis of the mass already present inside the reactor 101 continues, with formation of gaseous pyrolysis products 117. This phase with batch mode ends when there is no gaseous hydrocarbons 117 still leaving the unit 107. After the batch mode ends, a continuous mode is started again.

At an applied output temperature of 350° C. at the exit of the extruder 200, the energy absorbed by the mass for heating from 20° C. to 350° C., with melting, is approximately 840 KJ/kg, and the energy absorbed by the mass upon further heating from 350° C. to 420° C., to pyrolyzed state, approximately 500 KJ/kg. This means that approximately 63% of the heat to be supplied to the mass in the process is supplied via the screw arrangement 200. The remaining 37% is supplied via the reactor 101

Figure 4:
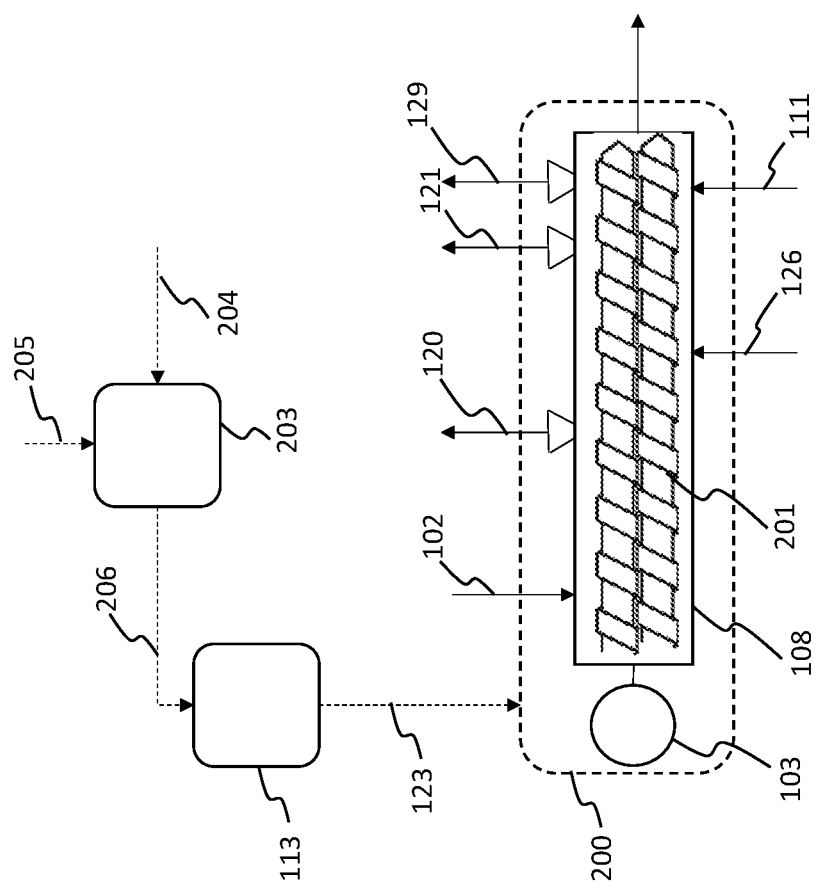
FIG. 4, FIG. 5 and FIG. 6 each illustrate a possibility for setting the screw arrangement, according to three different embodiments of the invention.
Figure 5:
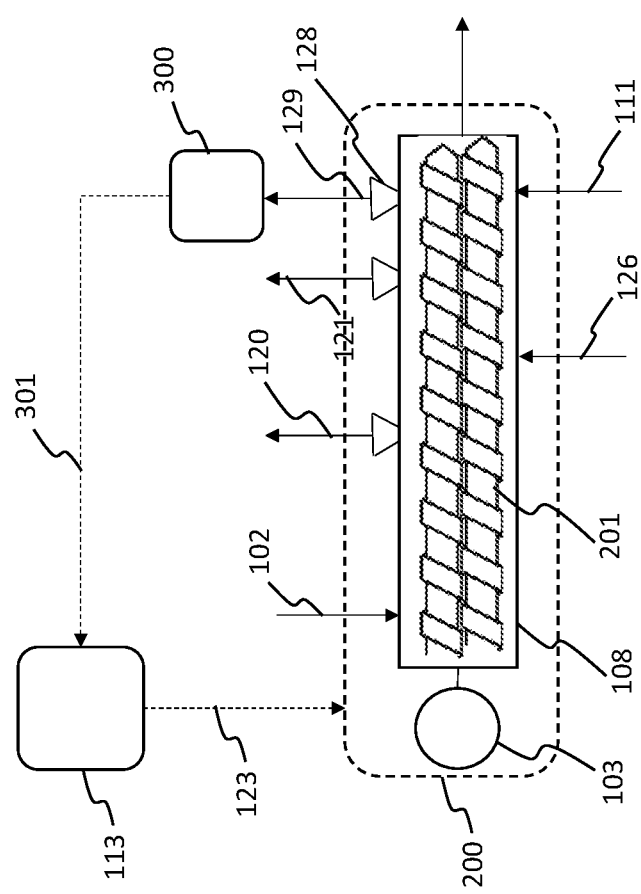
Figure 6:
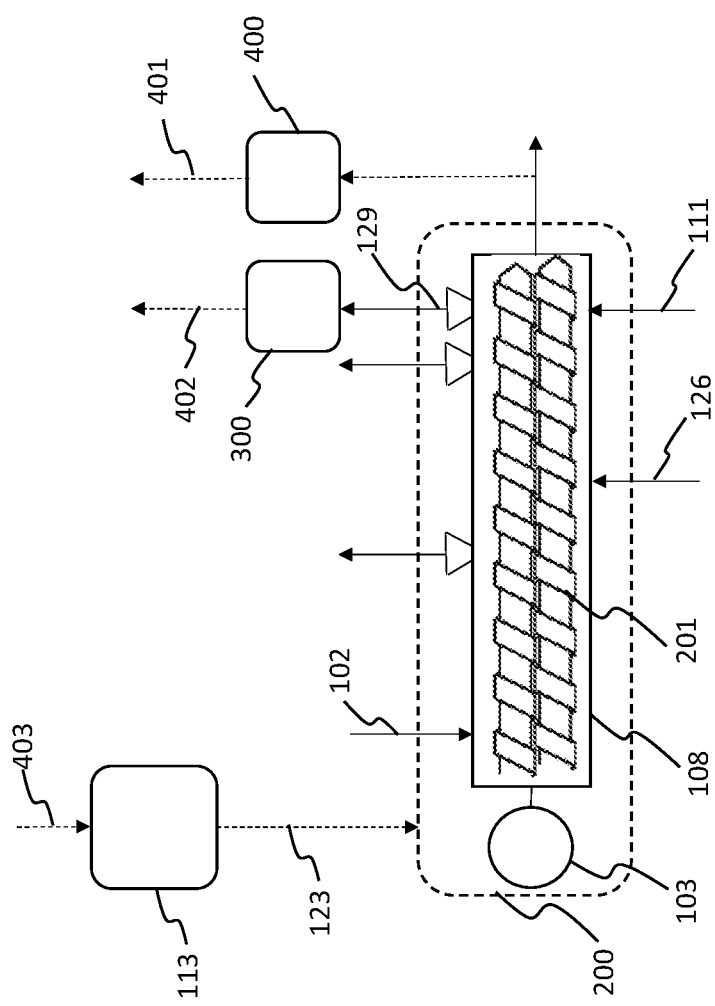

Within the described embodiment, the gaseous pyrolysis products 117 leaving the unit 107 are cooled to about 70° C. Various types of liquid oils can be formed, such as for example paraffins, isoparaffins, aromatics, fuel similar to diesel, etc. The condensate, at a temperature of about 70° C., is collected in a crude oil reservoir, for example. The method according to the invention, in the first place requires a selection or design of the screw arrangement 200 that is able to establish the intended extreme condition. Apart from that, there are different ways to suitably set or adjust the screw arrangement 200, as is illustrated in FIG. 4, FIG. 5 and FIG. 6. In each of these embodiments, the screw arrangement 200 is controlled by a control unit 113, for example a PLC, regulator or controller. The control or setting of the screw arrangement 200 takes place via a signal 123 with which, for example, the speed of the motor 103 is changed, or the set power of the motor 103 is changed, or heating zones on the drum wall 108 are adjusted. The control unit 113 in turn receives a signal, which can be interpreted in various ways, see the signal 206, 301 or 403 as illustrated in the embodiments of FIGS. 4, FIG. 5 and FIG. 6, respectively.

In FIG. 4, an embodiment is presented in which the setting of the screw arrangement 200 is made by means of a computing unit 203, for example a computer, processor or PLC. The computing unit 203 receives input 204 which indicates the type of waste material. One type of waste material is for example: a mix of PE and PP, a mix of PE, PP and PVC, rubber, etc. The mass of waste material can have a heterogeneous composition, in the sense that different types of components are present. One type of waste material has an approximately constant composition, averaged over time. For example, the type of waste material is entered via a setting screen. The computing unit 203 may further take into account a number of parameter values 205 known beforehand. For example, tables are available in which the target exit temperature is given for different types of waste material. Based on the received input, a desired output temperature is determined. The desired output temperature is then communicated to the control unit 113, see signal 206. The control unit 113 computes how the screw arrangement 200 should be set in order to realize the desired output temperature 206, for example which speed or engine power is optimal, and thus controls the screw arrangement 200, see 123.

In FIG. 5, an embodiment is presented in which the setting of the screw arrangement 200 is based on a measurement. For this purpose, a measuring unit 300 is used, which determines the composition of vapors released from the screw arrangement 200, at a position close to the output. For example, the outlet port 128 is used. When inside the screw arrangement the breaking of carbon-carbon bonds already occurs, the presence of volatile hydrocarbons can be detected in the measured composition. Based on this detection, a signal 301 is communicated to the control unit 113, which adjusts the setting of the screw arrangement to avoid further exceeding the threshold value.

In FIG. 6 an embodiment is presented for a one-time setup of the screw arrangement 200. In this embodiment, a measuring unit 300 is used, which determines the composition of vapors 129 leaving the screw arrangement 200, analogously to the embodiment of FIG. 5. It is hereby detected whether or not there are volatile hydrocarbons, see 402. There is also a measuring unit 400 present which measures the temperature 401 of mass at the output of the screw arrangement 200. In the experimental setup the settings of the screw arrangement are gradually adjusted, via communication with the control unit 113, see 403. For example, if the speed is gradually increased, and hydrocarbons are detected from a certain speed, then the targeted extreme condition is reached. Such an experimental setup can be performed once, if, for example, the same type of waste material continues to be used. After the experimental determination of the extreme condition, the screw arrangement is then set once, and the setting is not changed anymore during the operational process.

Although the present invention has been illustrated with reference to specific embodiments, it will be apparent to those skilled in the art that the invention is not limited to the details of the foregoing illustrative embodiments, and that the present invention may be embodied with various modifications and adjustments without departing from the scope of the invention. The present embodiments are therefore to be regarded as illustrative and not restrictive in all respects, the scope of the invention being described by the appended claims and not by the foregoing description, and any modifications which come within the meaning and scope of the claims, are therefore included. In other words, it is understood that this includes any changes, variations or equivalents that fall within the scope of the underlying principles and whose essential attributes are claimed in this patent application. In addition, the reader of this patent application will appreciate that the words "comprising" or "comprise" do not exclude other elements or steps, and that the word "a" does not exclude plurals. Any references in the claims should not be construed as limiting the claims in question. The terms "first", "second", "third", "a", "b", "c" and the like, when used in the specification or in the claims, are used to distinguish between similar elements or steps and do not necessarily describe a sequential or chronological order. Likewise, the terms "top", "bottom", "over", "under" and the like are used for purposes of description and do not necessarily refer to relative positions. It is to be understood that those terms are interchangeable under appropriate circumstances and that embodiments of the invention are capable of functioning according to the present invention in other orders or orientations than those described or illustrated above.

The invention claimed is:

1. A method for pyrolysis of a mass of waste material, comprising:
   providing a screw arrangement adapted to supply heat to said mass by mechanical shear;
   providing a connecting element, wherein said connecting element is connected to an exit of said screw arrangement;
   providing a reactor downstream of said connecting element, wherein said reactor is adapted to supply heat to said mass in absence of oxygen by heating a reactor wall with an external heat source;
   heating said mass in said screw arrangement to an exit temperature such that said mass is at least partially melted;
   transporting said mass through said connecting element; and
   thermally degrading said mass in said reactor such that carbon-carbon bonds in said mass are broken by pyrolysis and volatile hydrocarbons are formed,
   wherein said method further comprises:
   increasing a pressure of said mass through said screw arrangement to an exit pressure; and
   expanding said mass in said connecting element, with a pressure drop from said exit pressure to a lower pressure;
   wherein said mass is brought into an extreme condition at said exit temperature and exit pressure by said screw arrangement, such that during said pressure drop pyrolysis occurs, thereby forming gaseous hydrocarbons within said connecting element.

2. The method according to claim 1, wherein increasing said pressure through said screw arrangement is such that during said heating in said screw arrangement pyrolysis of said mass is avoided, or such that at most 1% mass percentage of hydrocarbons present in said mass at an entrance of said screw arrangement is converted into gaseous hydrocarbons during said heating in said screw arrangement.

3. The method according to claim 2, wherein gaseous hydrocarbons released during said heating in said screw arrangement leave said screw arrangement via one or more outlet ports on said screw arrangement.

4. The method according to claim 1, wherein said method further comprises:
  evacuating water vapor, being released from said mass during said heating in said screw arrangement, via a first outlet port on said screw arrangement;
  evacuating gases comprising halogens, being released from said mass during said heating in said screw arrangement, via a second outlet port on said screw arrangement;
  evacuating gaseous hydrocarbons, being released from said mass during said heating in said screw arrangement, via a third outlet port on said screw arrangement.

5. The method according to claim 1, wherein said connecting element provides a direct connection between said screw arrangement and said reactor, and said pressure drop is from said exit pressure to a reactor pressure lower than said exit pressure, or
  said connecting element provides a connection between said screw arrangement and a buffer tank placed between said screw arrangement and said reactor and said pressure drop is from said exit pressure to a pressure in said buffer tank lower than said exit pressure.

6. The method according to claim 5, wherein said method further comprises:
  transporting said mass through said connecting element, wherein said gaseous hydrocarbons formed during said pressure drop, are carried by a mass flowing towards said reactor or towards said buffer tank.

7. The method according to claim 1, wherein gaseous hydrocarbons formed in said connecting element during said pressure drop, occur as gas bubbles present within a melted mass.

8. The method according to claim 1, wherein a pressure difference between said exit pressure and said lower pressure causes said mass to flow, thereby transporting said mass through said connecting element.

9. The method according to claim 1, wherein said mass of waste material comprises at least 80 mass % of PolyEthylene and/or PolyPropylene, and said exit temperature is higher than 330° C.

10. The method according to claim 1, wherein said reactor comprises a reservoir adapted to be filled to a filling level with said mass, wherein said reservoir optionally includes a mixing arrangement positioned inside said reservoir and adapted to mix said mass;
  no arrangement is present for transporting said mass through said reservoir.

11. The method according to claim 10, wherein said reactor is operated alternately in a continuous mode and in a batch mode, wherein
  in said continuous mode, mass is continuously fed into said reactor during said thermally degrading, and
  in said batch mode, no mass is fed into said reactor during said thermally degrading.

12. The method according to claim 1, wherein during said thermally degrading said reactor wall is heated such that a pyrolysis temperature prevails inside said reactor, wherein said pyrolysis temperature is 50° C. to 150° C. higher than said exit temperature, and
  wherein said pyrolysis temperature in said reactor during said batch mode is higher than said pyrolysis temperature during said continuous mode by 60° C. to 100° C.

13. The method according to claim 1, wherein
  said screw arrangement comprises three different outlet ports, adapted to evacuate water vapor, gases comprising halogens, and gaseous hydrocarbons from said screw arrangement;
  said connecting element comprises a closed wall and is adapted to transport a mass comprising gaseous hydrocarbons formed during said expanding by allowing said mass to flow through said connecting element in presence of said exit pressure.

14. The method according to claim 1, wherein said connecting element comprises one or more pipes, and
  wherein an inner surface of said one or more pipes is provided with a coating having anti-sticking properties, said coating being adapted to reduce sticking of said mass to said inner surface.

15. Method according to claim 1, wherein said method further comprises detecting, by means of a measurement, gaseous hydrocarbons being released from said mass in said screw arrangement.

* * * * *